(12) United States Patent
Huang

(10) Patent No.: US 6,446,764 B1
(45) Date of Patent: Sep. 10, 2002

(54) MONITORING APPARATUS FOR WHEEL UNITS OF AN AUTOMOBILE

(76) Inventor: Tien-Tsai Huang, No. 4, Lane 30, Wu-Chuan St., Pan-Chiao City, Taipei Hsien (TW)

(*) Notice: Subject to any disclaimer, the term of this patent is extended or adjusted under 35 U.S.C. 154(b) by 0 days.

(21) Appl. No.: 10/101,257

(22) Filed: Mar. 19, 2002

(51) Int. Cl.$^7$ ............................ B60C 23/00; F16D 66/00
(52) U.S. Cl. ................... 188/1.11 L; 340/442; 340/454
(58) Field of Search ........................ 188/1.11 L, 1.11 E; 340/442, 447, 448, 454; 73/146.2, 146.5

(56) References Cited

U.S. PATENT DOCUMENTS

| | | | |
|---|---|---|---|
| 3,975,706 A | * 8/1976 | Kato ........................ 340/52 A |
| 4,334,428 A | * 6/1982 | Fima et al. ................. 73/146.5 |
| 4,837,553 A | * 6/1989 | Pompier ..................... 340/442 |
| 6,169,480 B1 | * 1/2001 | Uhl et al. ................... 340/442 |
| 6,194,999 B1 | * 2/2001 | Uhl et al. ................... 340/447 |

* cited by examiner

*Primary Examiner*—Christopher P. Schwartz
(74) *Attorney, Agent, or Firm*—Webb Ziesenheim Logsdon Orkin & Hanson, P.C.

(57) ABSTRACT

In a monitoring apparatus, a conductive coupling member is embedded in a brake pad of a brake system and is spaced apart from a first brake member by a thickness of the brake pad when wearing of the brake pad has yet to reach a predetermined worn-out state. A wear detecting circuit is coupled to the coupling member for detecting wear condition of the brake pad, and is capable of outputting a wear signal when the brake system is activated and the brake pad ceases to space apart the coupling member from the first brake member. A pressure detecting unit generates a pressure signal in accordance with pressure condition in a pneumatic tire. A processing unit receives the wear signal and the pressure signal, and enables an indicating unit to indicate the pressure condition in the pneumatic tire and the wear condition of the brake pad.

5 Claims, 7 Drawing Sheets

MONITORING APPARATUS FOR WHEEL UNITS OF AN AUTOMOBILE

BACKGROUND OF THE INVENTION

1. Field of the Invention

The invention relates to a monitoring apparatus, more particularly to a monitoring apparatus for wheel units of an automobile.

2. Description of the Related Art

Figure 1:
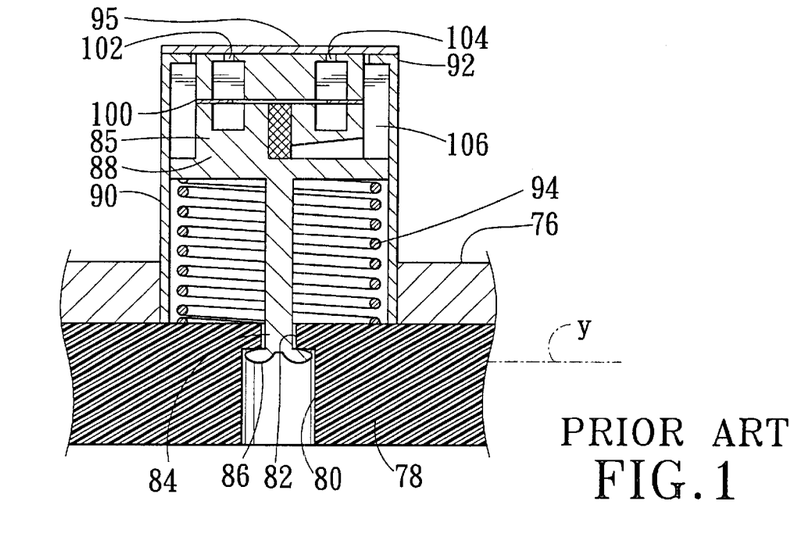
FIG. 1 is a fragmentary schematic sectional view showing a conventional brake assembly.

Referring to FIG. 1, a conventional brake assembly for braking a brake disk of a wheel is shown to include a pad-mounting seat unit 76, a brake pad unit 78, a retaining housing 90, a compression spring 94, a sound generating unit 88, and a seal 95.

As illustrated, the brake pad unit 78 is fixed on the pad-mounting seat unit 76, and has a retention recess 80. The brake pad unit 78 is movable together with the pad-mounting seat unit 76 toward the brake disk (not shown) to frictionally contact the brake disk and stop rotation of the wheel. The housing 90 is fixed on the pad-mounting seat unit 76, and defines a chamber 106 with a distal open end 92. The sound generating unit 88 includes a block body 85 disposed slidably and movably within the chamber 106, and having a fastener element 84 with a bifurcated enlarged end 86 that extends into the recess 80 of the brake pad unit 78 via a passage 82 in the brake pad unit 78 so as to be retained in the recess 80. The seal 95 is removably mounted on the open end 92 of the housing 90 so as to conceal the sound generating unit 88. The compression spring 94 is disposed in the chamber 106, and has two opposite ends abutting against the brake pad unit 78 and the sound generating unit 88.

In case the enlarged end 86 of the fastener element 84 wears out concurrently with the brake pad unit 78 due to frequent braking operation of the brake assembly, the block body 85 will be pushed away from the brake pad unit 78 by virtue of the restoration force of the compression spring 94 so as to remove the seal 92 from the housing 90. Under this condition, air flows into air passages 102, 104 in the block body 85 to activate a diaphragm 100 that is disposed within the block body 85 of the sound generating unit 88, thereby generating a warning sound.

The aforesaid conventional brake assembly includes a relatively large number of components, each of which is formed separately prior to assembly thereof, thereby resulting in a long assembly time and high manufacturing costs.

SUMMARY OF THE INVENTION

Therefore, the object of the present invention is to provide a monitoring apparatus for wheel units of an automobile that can monitor pressure condition in pneumatic tires of the wheel units and wear condition of brake pads of the wheel units.

According to the present invention, a monitoring apparatus is adapted for use with a wheel unit of an automobile. The wheel unit includes a pneumatic tire and a brake system for braking the pneumatic tire. The brake system includes a conductive first brake member mounted on the pneumatic tire, and a second brake member provided with a brake pad that is disposed adjacent to the first brake member. The brake system is operable so as to enable the second brake member to move toward the first brake member such that the brake pad frictionally contacts the first brake member to brake the pneumatic tire. The monitoring apparatus comprises:

a conductive coupling member adapted to be embedded in the brake pad such that the conductive coupling member is spaced apart from the first brake member by a thickness of the brake pad when wearing of the brake pad has yet to reach a predetermined worn-out state;

a wear detecting circuit coupled electrically to the coupling member for detecting wear condition of the brake pad, the wear detecting circuit being capable of outputting a wear signal when the brake system is activated and the brake pad ceases to space apart the conductive coupling member from the first brake member;

a pressure detecting unit for detecting pressure condition in the pneumatic tire and for generating a pressure signal in accordance with the pressure condition in the pneumatic tire;

a processing unit coupled electrically to the wear detecting circuit and the pressure detecting unit for receiving the wear signal and the pressure signal therefrom; and an indicating unit coupled electrically to and enabled by the processing unit to indicate whether the brake pad has reached the predetermined worn-out state and to further indicate the pressure condition in the pneumatic tire.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 2:
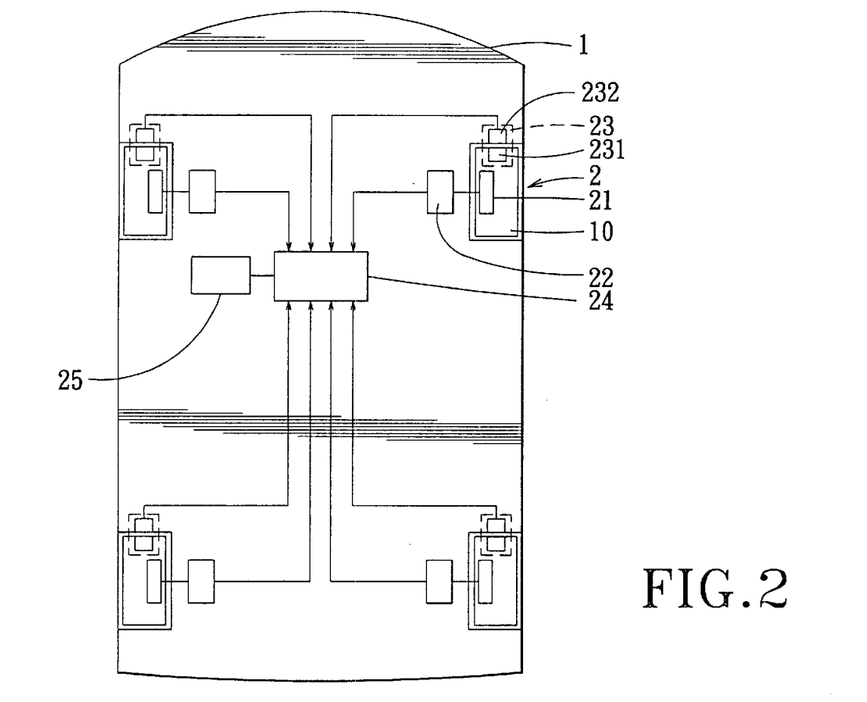
FIG. 2 is a schematic view illustrating the first preferred embodiment of a monitoring apparatus for wheel units of an automobile according to this invention.
Figure 3:
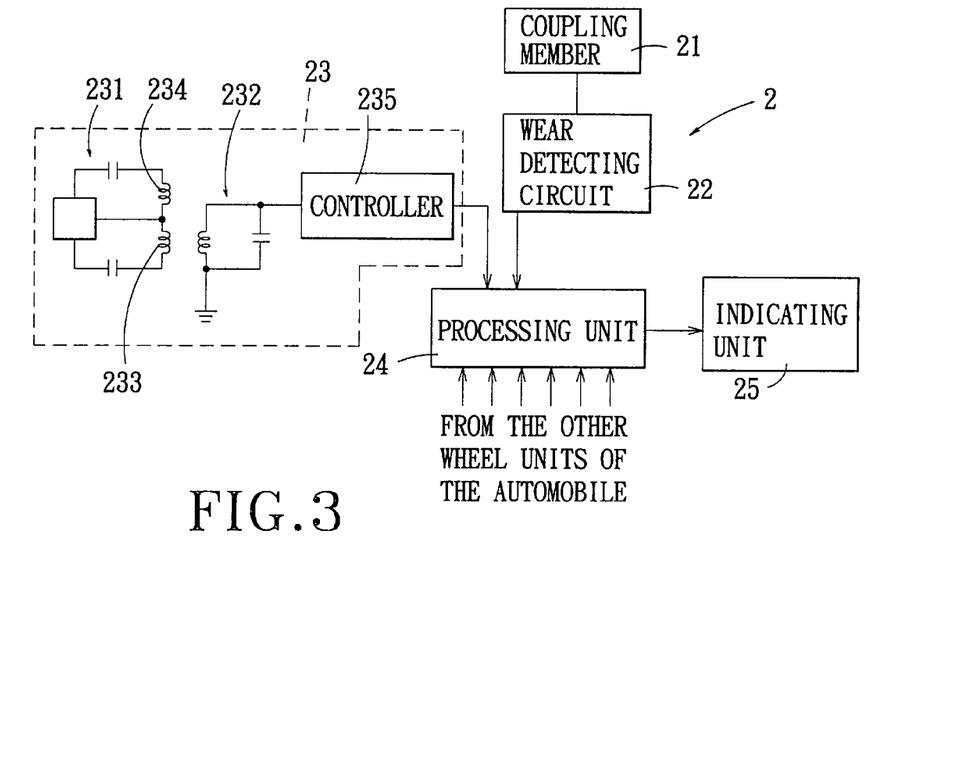
FIG. 3 is a schematic circuit block diagram illustrating the first preferred embodiment.
Figure 4:
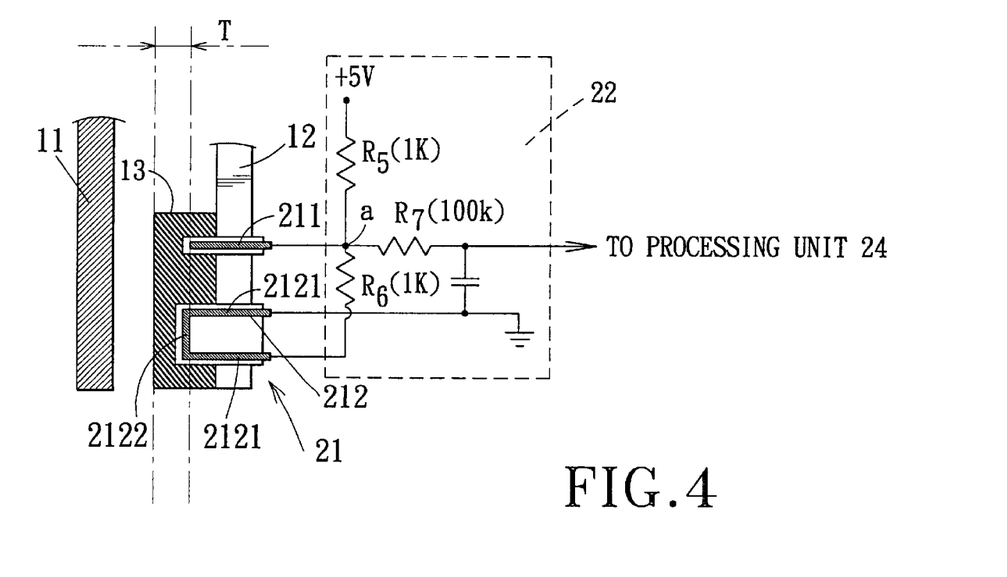
FIG. 4 is a schematic view illustrating a conductive coupling member and a wear detecting circuit of the first preferred embodiment when wearing of a brake pad has yet to reach a predetermined worn-out state.

Referring to FIGS. 2 and 3, the first preferred embodiment of a monitoring apparatus 2 for wheel units of an automobile according to the present invention is shown to include a conductive coupling member 21, a wear detecting circuit 22, a pressure detecting unit 23, a processing unit 24, and an indicating unit 25. Each of the wheel units includes a pneumatic tire 10 and a brake system for braking the pneumatic tire 10. The brake system includes a conductive first brake member 11, such as a metal brake disk, mounted on the pneumatic tire 10, and a second brake member 12 provided with a brake pad 13 that is disposed adjacent to the first brake member 11, as shown in FIG. 4. The brake system is operable in a conventional manner so as to enable the second brake member 12 to move toward the first brake member 11 such that the brake pad 13 frictionally contacts the first brake member 11 to brake the pneumatic tire 10.

Referring to FIG. 4, the conductive coupling member 21 is adapted to be embedded in the brake pad 13 such that the conductive coupling member 21 is spaced apart from the first brake member 11 by a thickness (T) of the brake pad 13 when wear of the brake pad 13 has yet to reach a predetermined worn-out state. In this embodiment, the conductive coupling member 21 includes first and second conducting pieces 211, 212. The second conducting piece 212 is U-shaped, and includes a pair of parallel plates 2121 and an intermediate plate 2122 interconnecting the parallel plates 2121.

Figure 5:
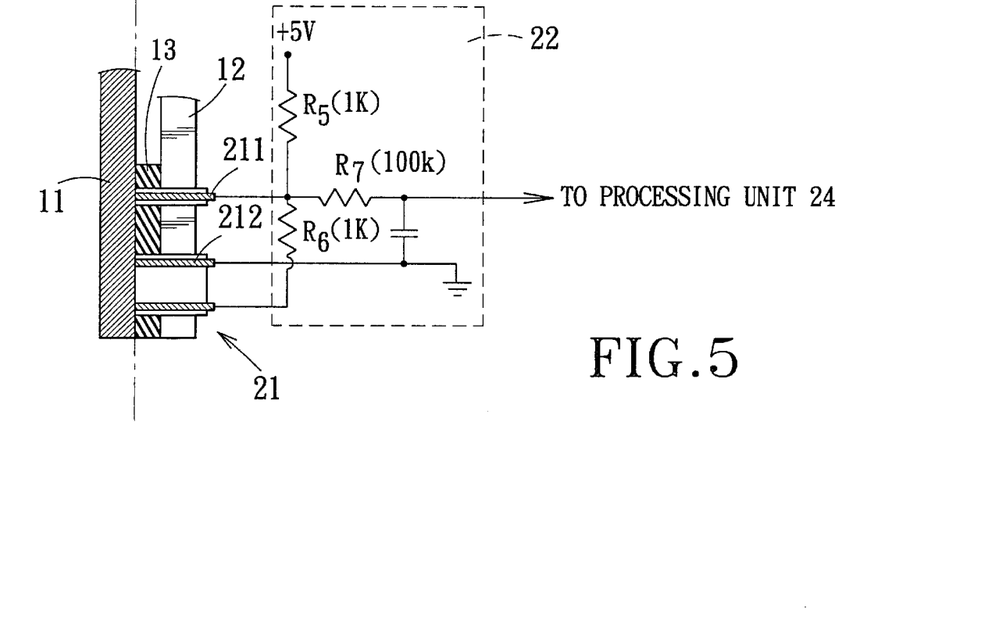
FIG. 5 is a schematic view illustrating the coupling member and the wear detecting circuit of the first preferred embodiment when a brake system is activated and wearing of the brake pad has reached the predetermined worn-out state.
Figure 6:
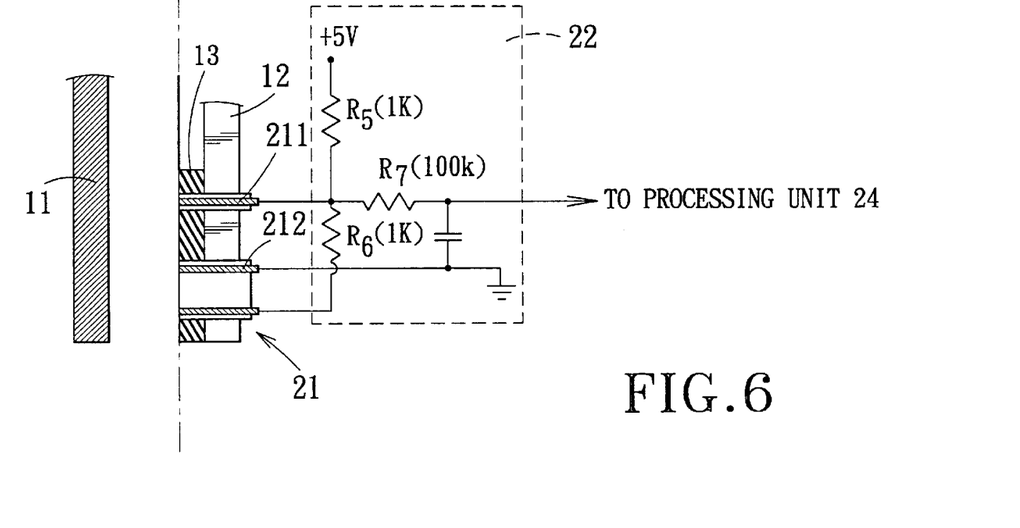
FIG. 6 is a schematic view illustrating the coupling member and the wear detecting circuit of the first preferred embodiment when the brake system is not activated and wearing of the brake pad has reached the predetermined worn-out state.

The wear detecting circuit 22 is coupled electrically to the coupling member 21 for detecting wear condition of the brake pad 13. The wear detecting circuit 22 is capable of outputting a wear signal when the brake system is activated and the brake pad 13 ceases to space apart the conductive coupling member 21 from the first brake member 11. In this embodiment, the wear detecting circuit 22 includes two resistors (R5, R6) having equal resistances of 1KΩ, and a resistor (R7) having a resistance of 100KΩ. The resistor (R5) has a first end connected to a voltage source (+5V), and a second end coupled to a node (a) that is coupled to the first conducting piece 211. The resistor (R6) has a first end connected to the node (a), and a second end connected to the ground via the second conducting piece 212. The resistor (R7) has a first end connected to the node (a), and a second end connected to the processing unit 24. Accordingly, as shown in FIG. 4, when wearing of the brake pad 13 has yet to reach the predetermined worn-out state, the wear detecting circuit 22 is capable of outputting a normal signal of +2.5V. As shown in FIG. 5, the intermediate plate 2122 is worn out when wearing of the brake pad 13 has reached the predetermined worn-state, which means that the brake pad 13 needs to be replaced, such that, when the brake system is activated, the wear detecting circuit 22 is capable of outputting the wear signal of 0V. As shown in FIG. 6, when the brake system is not activated and wearing of the brake pad 13 has reached the predetermined worn-out state, the wear detecting circuit 22 is capable of outputting another wear signal of +5V.

Figure 10:
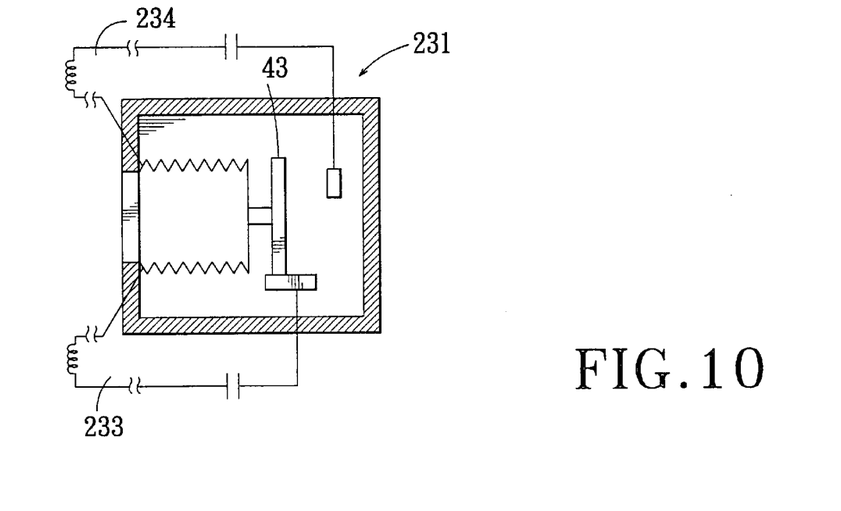
FIG. 10 is a schematic view illustrating a pressure-respective resonant switching device of the first preferred embodiment in a normal switch position.
Figure 11:
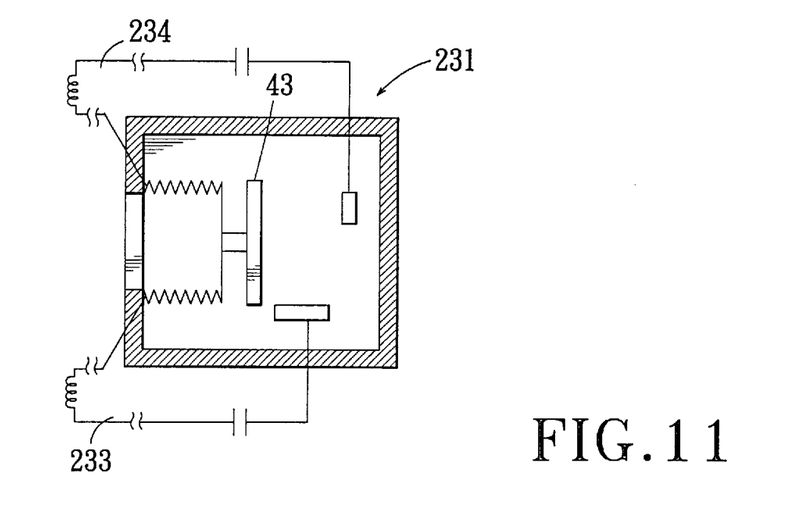
FIG. 11 is a schematic view illustrating the pressure-respective resonant switching device of the first preferred embodiment in an under-inflated switch position.
Figure 12:
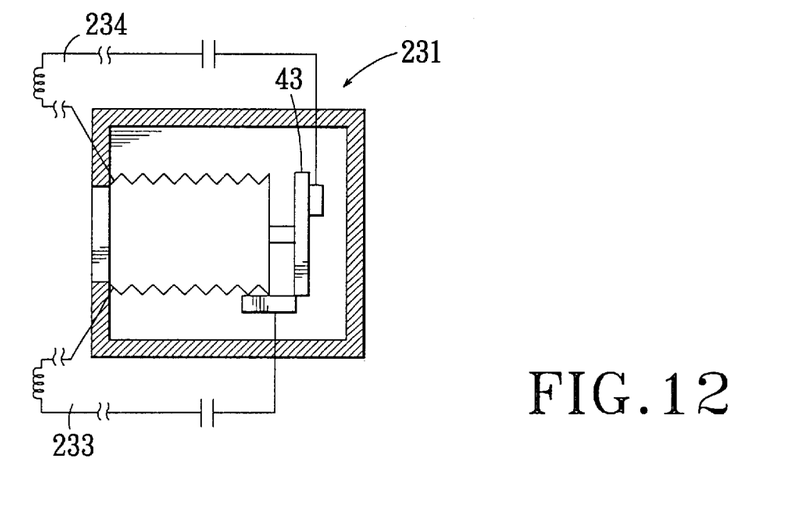
FIG. 12 is a schematic view illustrating the pressure-respective resonant switching device of the first preferred embodiment in an over-inflated switch position.

Referring again to FIGS. 2 and 3, the pressure detecting unit 23 detects pressure condition in the pneumatic tire 10, and generates a pressure signal in accordance with the pressure condition in the pneumatic tire 10. The pressure detecting unit 23 includes a pressure-responsive resonant switching device 231, an excitation unit 232, and a controller 235. The resonant switching device 231 is adapted to be mounted on the pneumatic tire 10 and is switchable between a normal impedance state, where the pressure in the pneumatic tire 10 is within a predetermined normal operating pressure range, and an abnormal impedance state, where the pressure in the pneumatic tire 10 is not within the predetermined normal operating pressure range. The excitation unit 232 is adapted to be disposed adjacent to the pneumatic tire 10. The controller 235 is connected to the excitation unit 232 and is operable so as to supply an excitation signal to the excitation unit 232 in order to enable the excitation unit 232 to co-act with the resonant switching device 231 by virtue of mutual induction according to the impedance state of the resonant switching device 231 for inducing current in the resonant switching device 231 as the resonant switching device 231 is moved so as to be proximate with the excitation unit 232 due to rotation of the pneumatic tire 10. The controller 235 monitors an output signal from the excitation unit 232 and detects presence of a change in the output signal of the excitation unit 232 due to inducing of the current in the resonant switching device 231 during a complete cycle of rotation of the pneumatic tire 10 to enable the controller 235 to determine the pressure condition in the pneumatic tire 10. In this embodiment, since the specific configuration of the pressure detecting unit 23 has been disclosed in U.S. Pat. No. 6,058,768, entitled "APPARATUS FOR DETECTING PRESSURE CONDITION IN A PNEUMATIC TIRE", filed by the applicant and, the entire disclosure of which is incorporated here in by reference, a detailed description of the same will be omitted herein for the sake of brevity. Accordingly, as shown in FIG. 10, a movable electrical contact 43 of the resonant switching device 231 is in a normal switch position when the pressure in the pneumatic tire 10 is within the determined normal operating pressure range. As shown in FIG. 11, the movable electrical contact 43 of the resonant switching device 231 is in an under-inflated switch position when the pressure in the pneumatic tire 10 is below the determined normal operating pressure range. As shown in FIG. 12, the movable electrical contact 43 of the resonant switching device 231 is in an over-inflated switch position when the pressure in the-pneumatic tire 10 is above the determined normal operating pressure range.

The processing unit 24 is coupled electrically to the wear detecting circuit 22 and the pressure detecting unit 23 for receiving the wear signals and the pressure signal therefrom.

The indicating unit 25 is coupled electrically to and is enabled by the processing unit 24 to indicate whether the brake pad 13 has reached the predetermined worn-out state and to further indicate the pressure condition in the pneumatic tire 10. The indicating unit 25 may include a display unit and a sound generator. The display unit can be a plurality of light emitting diodes.

Figure 7:
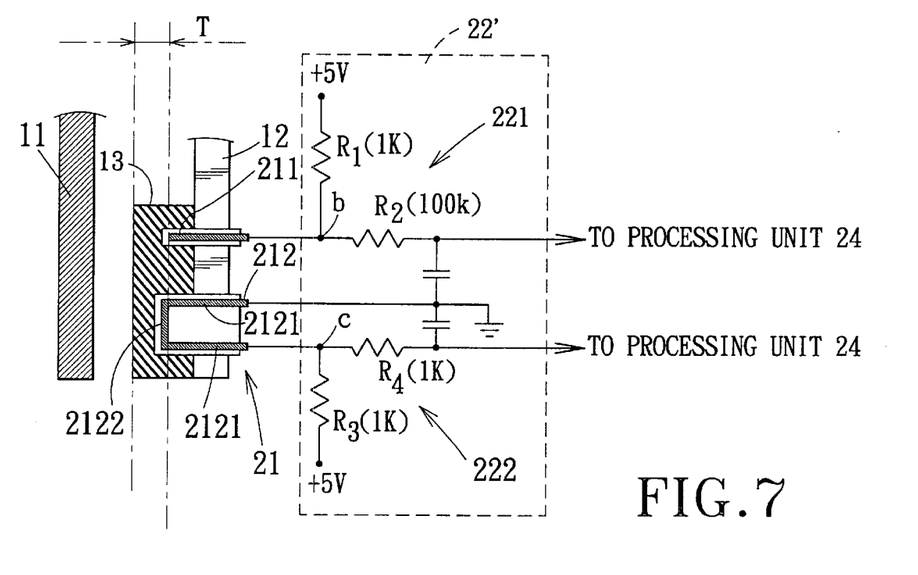
FIG. 7 is a schematic view illustrating a conductive coupling member and a wear detecting circuit of the second preferred embodiment of a monitoring apparatus according to the present invention when wearing a brake pad has yet to reach a predetermined worn-out state.
Figure 8:
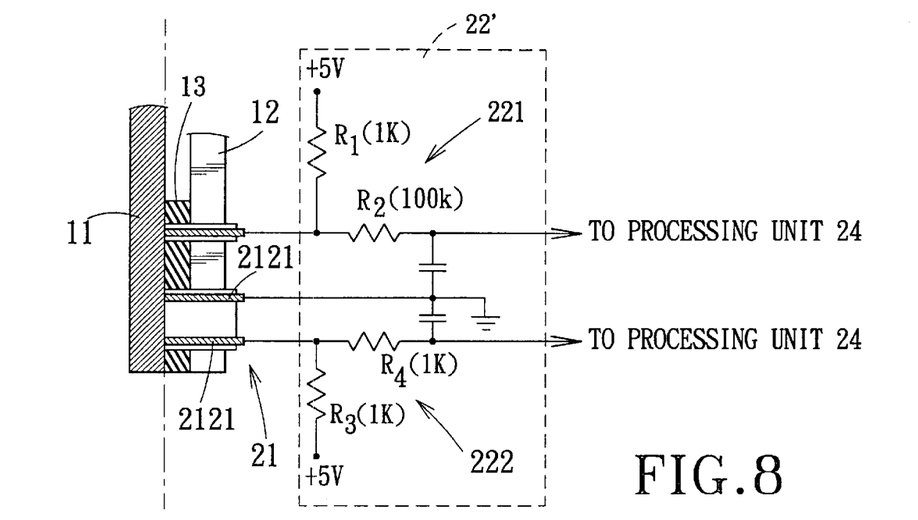
FIG. 8 is a schematic view illustrating the coupling member and the wear detecting circuit of the second preferred embodiment when a brake system is activated and wearing of the brake pad has reached the predetermined worn-out state.
Figure 9:
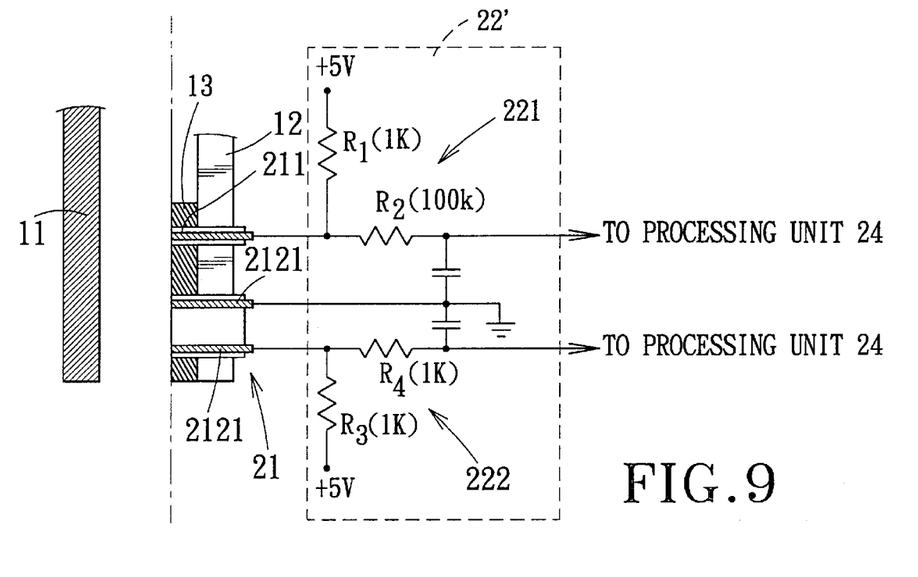
FIG. 9 is a schematic view illustrating the coupling member and the wear detecting circuit of the second preferred embodiment when the brake system is not activated and wearing of the brake pad has reached the predetermined worn-out state.
Figure 13:
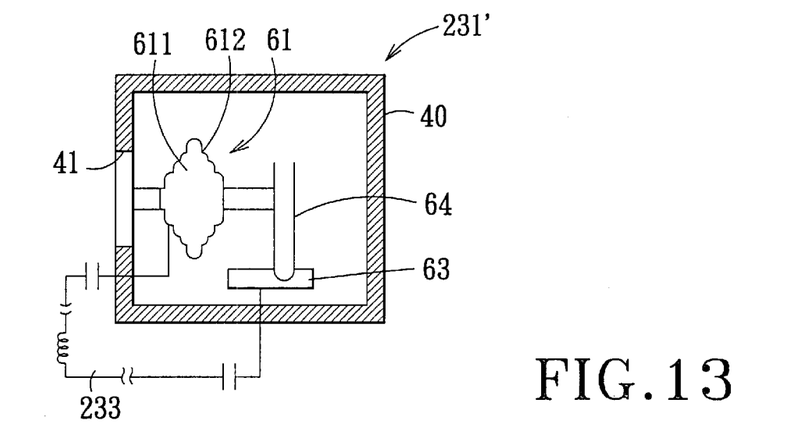
FIG. 13 is a schematic view illustrating a pressure-respective resonant switching device of the second preferred embodiment in a normal switch position.

FIGS. 7, 8, 9 and 13 illustrate the second preferred embodiment of a monitoring apparatus according to the present invention, which is a modification of the first preferred embodiment. Unlike the previous embodiment, the wear detecting circuit 22' includes first and second detecting circuits 221, 222 coupled electrically and respectively to the first and second conducting pieces 211, 212. In this embodiment, the first detecting circuit 221 includes first and second resistors (R1, R2) having resistances of 1KΩ and 100KΩ, respectively. The first resistor (R1) has a first end connected to a voltage source (+5V), and a second end connected to a node (b) that is connected to the first conducting piece 211. The second resistor (R2) has a first end connected to the node (b), and a second end connected to the processing unit 24. The second detecting circuit 222 includes third and fourth resistors (R3, R4) having equal resistances of 1KΩ. The third resistor (R3) has a first end connected to a voltage source (+5V), and a second end connected to a node (c) that is connected to the ground via the second conducting piece 212. The fourth resistor (R4) has a first end connected to the node (c), and a second end connected to the processing unit 24. Accordingly, as shown in FIG. 7, when wearing of the brake pad 13 has yet to reach the predetermined worn-out state, the first detecting circuit 221 is capable of outputting a normal signal of +5V, and the second detecting circuit 222 is capable of outputting another normal signal of 0V. As shown in FIG. 8, the intermediate plate 2122 is worn out when wearing of the brake pad 13 has reached the predetermined worn-state such that, when the brake system is activated, the first and second conducting pieces 211, 212 will be connected electrically to each other via the first brake member 11, thereby connecting the second detecting circuit 222 to the first detecting circuit 221 to enable the first detecting circuit 221 to generate the wear signal of 0V. As shown in FIG. 9, when the brake system is not activated and wearing of the brake pad 13 has reached the predetermined worn-out state, the parallel plates 2121 will be disconnected from each other to enable the second detecting circuit 222 to generate another wear signal of +5V. Furthermore, as shown in FIG. 13, while the specific configuration of the resonant switching device 231' differs from that of the first preferred embodiment, the configuration as such has also been disclosed in U.S. Pat. No. 6,058,768, and thus, a detailed description of the same will be omitted herein for the sake of brevity.

Figure 14:
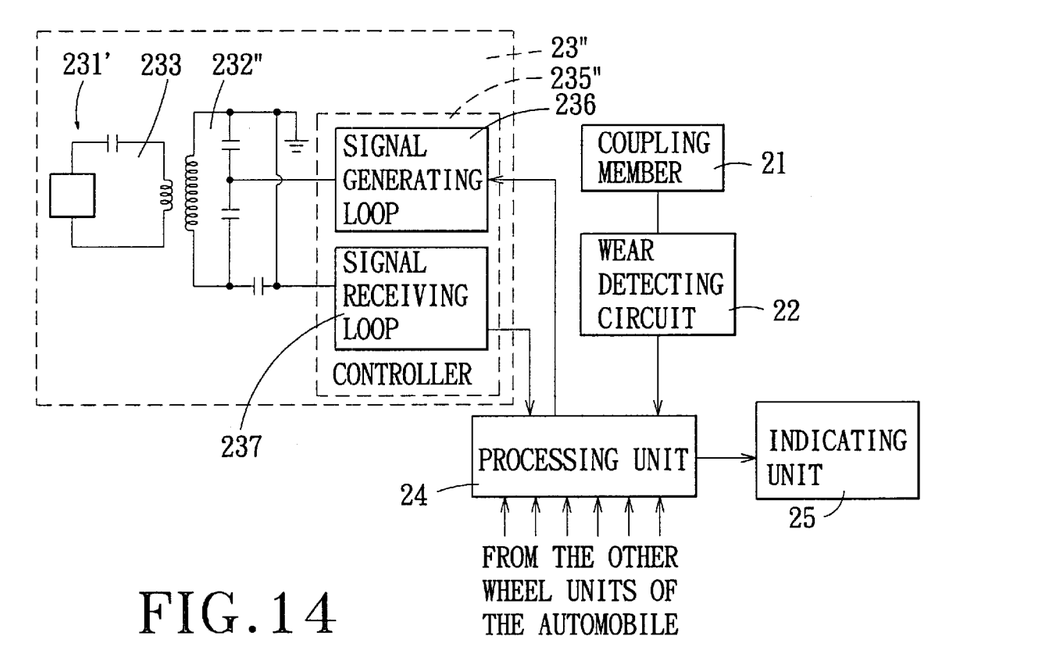
FIG. 14 is a schematic electrical circuit diagram illustrating the third preferred embodiment of a monitoring apparatus according to the present invention.

FIG. 14 illustrates the third preferred embodiment of a monitoring apparatus according to the present invention, which is a modification of the first preferred embodiment. Unlike the previous embodiments, the controller 235" of the pressure detecting unit 23" includes a signal generating loop 236 and a signal receiving loop 237. The signal generating loop 236 is connected electrically to and is controlled by the processing unit 24 so as to generate a periodic high frequency signal to the excitation unit 232". Whether the resonant switching device 231' is in a closed-circuit or open-circuit state can be determined via the signal receiving loop 237, which is connected electrically to the processing unit 24 and the excitation unit 232", thereby enabling the processing unit 24 to determine the pressure condition in the pneumatic tire.

It is noted that, due to the presence of the wear detecting circuit 22, 22' and the pressure detecting unit 23, 23', 23", the monitoring apparatus 2 of the present invention can detect and indicate the wear condition of each brake pad 13 in the brake system and the pressure condition in each pneumatic tire 10, thereby resulting in enhanced safety during driving the automobile.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A monitoring apparatus for a wheel unit of an automobile, the wheel unit including a pneumatic tire and a brake system for braking the pneumatic tire, the brake system including a conductive first brake member mounted on the pneumatic tire, and a second brake member provided with a brake pad that is disposed adjacent to the first brake member, the brake system being operable so as to enable the second brake member to move toward the first brake member such that the brake pad frictionally contacts the first brake member to brake the pneumatic tire, said monitoring apparatus comprising:

a conductive coupling member adapted to be embedded in the brake pad such that said conductive coupling member is spaced apart from the first brake member by a thickness of the brake pad when wearing of the brake pad has yet to reach a predetermined worn-out state;

a wear detecting circuit coupled electrically to said conductive coupling member for detecting wear condition of the brake pad, said wear detecting circuit being capable of outputting a wear signal when the brake system is activated and the brake pad ceases to space apart said conductive coupling member from the first brake member;

a pressure detecting unit for detecting pressure condition in the pneumatic tire and for generating a pressure signal in accordance with the pressure condition in the pneumatic tire;

a processing unit coupled electrically to said wear detecting circuit and said pressure detecting unit for receiving the wear signal and the pressure signal therefrom; and an indicating unit coupled electrically to and enabled by said processing unit to indicate whether the brake pad has reached the predetermined worn-out state and to further indicate the pressure condition in the pneumatic tire.

2. The monitoring apparatus as claimed in claim 1, wherein said pressure detecting unit includes:

a pressure-responsive resonant switching device adapted to be mounted on the pneumatic tire and switchable between a normal impedance state, where the pressure in the pneumatic tire is within a predetermined normal operating pressure range, and an abnormal impedance state, where the pressure in the pneumatic tire is not within the predetermined normal operating pressure range;

an excitation unit adapted to be disposed adjacent to the pneumatic tire; and a controller connected to said excitation unit and operable so as to supply an excitation signal to said excitation unit in order to enable said excitation unit to co-act with said resonant switching device by virtue of mutual induction according to the impedance state of said resonant switching device for inducing current in said resonant switching device as said resonant switching device is moved so as to be proximate with said excitation unit due to rotation of the pneumatic tire, said controller monitoring an output signal from said excitation unit and detecting presence of a change in the output signal of said excitation unit due to inducing of the current in said resonant switching device during a complete cycle of rotation of the pneumatic tire to enable said controller to determine the pressure condition in the pneumatic tire.

3. The monitoring apparatus as claimed in claim 1, wherein said conductive coupling member includes first and second conducting pieces, said wear detecting circuit being coupled electrically to said first and second conducting pieces such that, when the brake system is activated and the brake pad ceases to space apart said conductive coupling member from the first brake member, said first and second conducting pieces will be connected electrically to each other via the first brake member so as to enable said wear detecting circuit to generate the wear signal.

4. The monitoring apparatus as claimed in claim 1, wherein said conductive coupling member includes first and second conducting pieces, said wear detecting circuit including first and second detecting circuits coupled electrically and respectively to said first and second conducting pieces such that, when the brake system is activated and the brake pad ceases to space apart said conductive coupling member from the first brake member, said first and second conducting pieces will be connected electrically to each other via the first brake member, thereby connecting said second detecting circuit to said first detecting circuit to enable said first detecting circuit to generate the wear signal.

5. The monitoring apparatus as claimed in claim 4, wherein said second conducting piece is U-shaped, and includes a pair of parallel plates and an intermediate plate interconnecting said parallel plates, said intermediate plate being worn out when wearing of the brake pad has reached the predetermined worn-out state such that, when the brake system is not activated, said parallel plates will be disconnected from each other to enable said second detecting circuit to generate another wear signal.

\* \* \* \* \*